United States Patent [19]

Llona

[11] 4,053,724
[45] Oct. 11, 1977

[54] PANEL AND PLURAL MODULE ASSEMBLY HAVING MECHANICAL KEYING AND MODULAR PLUG STRUCTURE TO ACTIVATE/DEACTIVATE AUTOMATICALLY BRIDGED LOAD CARRYING CIRCUITS

[76] Inventor: Jesus Gomez Llona, Munguia (Vizcaya), Spain

[21] Appl. No.: 588,618

[22] Filed: June 19, 1975

[30] Foreign Application Priority Data

| June 21, 1974 | Spain | 427518 |
| Feb. 12, 1975 | Spain | 434666 |
| Feb. 12, 1975 | Spain | 434667 |

[51] Int. Cl.² ..................... H01R 13/70; H01R 33/54
[52] U.S. Cl. .............................. 200/51 R; 200/51.09; 200/51.1; 361/331
[58] Field of Search ............. 200/50 AA, 50 B, 51 A, 200/51.09, 51.1, 51.11; 317/107, 112, 113, 119, 120; 361/331, 335

[56] References Cited

U.S. PATENT DOCUMENTS

| 2,802,972 | 8/1957 | Warrington | 200/51.1 X |
| 3,090,948 | 5/1963 | Cremer | 200/51.1 X |
| 3,183,468 | 5/1965 | Hennessey, Jr. | 200/51.09 X |
| 3,339,038 | 8/1967 | Jorgensen et al. | 200/50 B |
| 3,509,297 | 4/1970 | King | 200/51.1 X |
| 3,512,043 | 5/1970 | Jaaksoo et al. | 200/51.1 X |
| 3,523,212 | 8/1970 | Murphy | 200/51.1 X |
| 3,523,218 | 8/1970 | Fradley et al. | 317/113 X |
| 3,627,929 | 12/1971 | Vlijmen et al. | 200/51.1 X |
| 3,804,998 | 4/1974 | Rexroad et al. | 200/50 AA |

*Primary Examiner*—James R. Scott
*Attorney, Agent, or Firm*—Eyre, Mann, Lucas & Just

[57] ABSTRACT

A master structure supports a plurality of independent switching and control units. Insertion of a switching and control unit into the master structure makes electrical connection. Load carrying circuits are automatically bridged by the removal of a unit. A test connector and plug enable in-circuit isolation and test of the electrical components within a unit. Mechanical keying insures correct location of units within the master structure.

6 Claims, 22 Drawing Figures

PANEL AND PLURAL MODULE ASSEMBLY HAVING MECHANICAL KEYING AND MODULAR PLUG STRUCTURE TO ACTIVATE/DEACTIVATE AUTOMATICALLY BRIDGED LOAD CARRYING CIRCUITS

BACKGROUND OF THE INVENTION

The electrical switching and control panels of electricity substations or other electrical installation are made up of panels in which are incorporated the various electrical and electronic appliances which are connected directly to the circuits of the installation, the panel thus creating one integral panel-appliance unit.

Control panels are usually made to order with no provision for reconverting them to any service different from that for which they were designed.

SUMMARY OF THE INVENTION

These drawbacks of conventionally constructed panels can be overcome by modular construction. In modular construction, switching and control panels are fitted into a support frame or cabinet in modular and interchangeable fashion. The panels may later be arranged and re-arranged in accordance with new operating requirements.

By the nature of switching and control devices, it is sometimes necessary to instantly withdraw one or more from service in order to repair damage, check the calibration, etc. In order to withdraw a load-carrying unit from service, it is necessary first to bridge the load carrying circuit in which the appliance is operating so that the circuit does not remain open, causing possible loss and damage. The problem of removal and bridging is so dangerous that often apparatus is left in the circuit to become destroyed rather than run the risk involved.

The present application teaches a cabinet containing modular electrical switching and control panels. Each panel is backed by a related appliance. Each appliance is electrically connected by insertion into the cabinet. Appliances are disconnected by simple removal, this action itself ensuring disconnection and withdrawal from service of the electrical elements. Removal automatically causes bridging or short-circuiting of the load carrying circuits in which the appliances were operating. In this way, external load circuits may continue to operate when one or more switching and control panel is removed. Each panel is composed of using units or modules which consists of a bearing structure on which is mounted the electrical measuring, regulating or protective electrical element. An electrical rear connector plate is mounted on each panel. The cabinet contains fixed connecting plates which establish connection between the circuits to be switched and controlled and the panels. The fixed connecting plates contain conductors which bridge load carrying circuits when the panel is removed. Insertion of the units lines up and couples their rear connector plates into the cabinet against the fixed connector plates in the cabinet. Split hexagonal key bars on the cabinet and on the panels ensures the insertion of the modular panel into the correct location.

This design is further improved by provision for making internal connection with certain elements within the modules, which make it possible to check elements thereof or to change the size in the case of transformers, without extracting them and withdrawing them from service, these operations being carried out from the front of the modules.

The attached drawings illustrate its use, such illustrations being in no way limitative, and being therefore capable of any accessory modifications which do not affect the essential characteristics.

DETAILED DESCRIPTION OF THE PREFERRED EMBODIMENT

Figure 1:
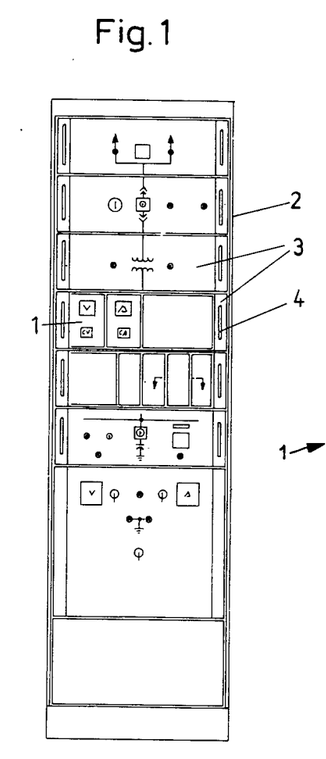
FIG. 1 is a front view of an electrical switching and control panel of modular construction.

Referring to FIG. 1, a cabinet or closed master structure 2 carries receiving means adapted for frontal access, in conjunction with a series of modular units 1 which are composed by a facia 10 and a guide frame with the mechanical arrangements most suitable for coupling within the master structure 1, the units occupying their receiving means by guided insertion.

Figure 8:
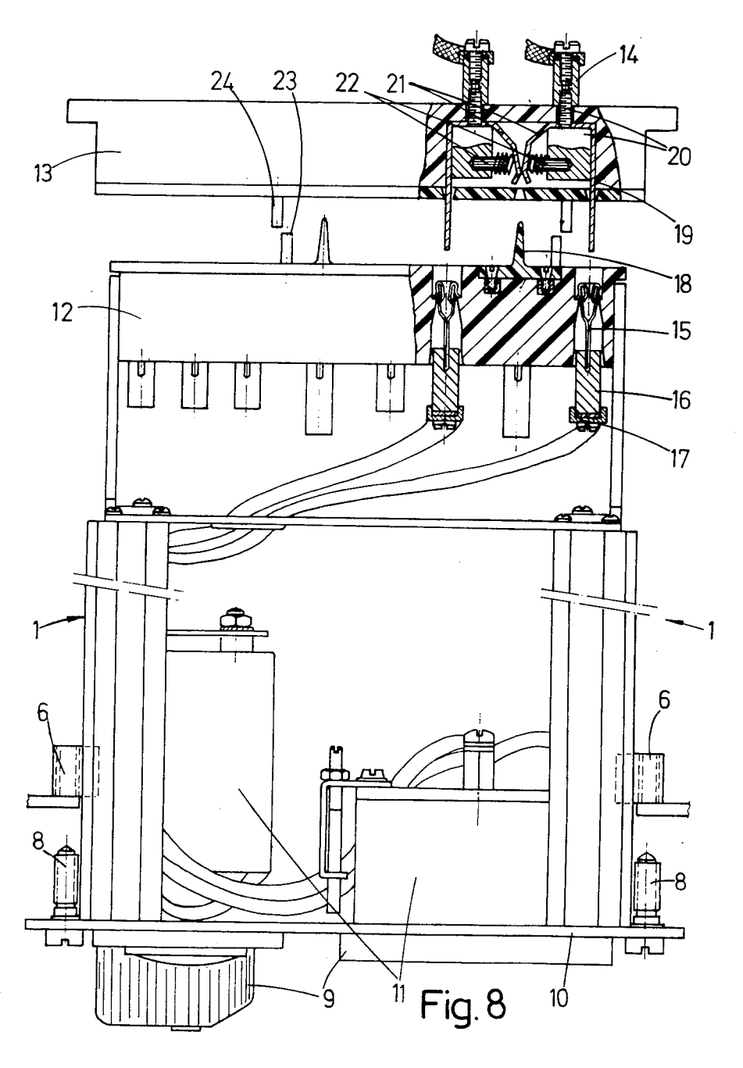
FIG. 8 shows a plan view of a meter unit, carrying behind it the fixed connector plate and showing how the action of inserting it into the cabinet has been partially completed.

Each of the units 1 carries within itself the electrical elements 11 to perform a specific function such as measuring (FIG. 8), protection (FIG. 9), control, switching, etc. All necessary dials, scales, control buttons and warning lights for the function are included on the facia 10.

All units 1 are electrically connected to connector plates 12 at the rear. Connector plates 12 have resilient "Y" shaped fork pieces 15 in holes situated as shown in FIGS. 8, 9, 10 and 11, defining therein female terminals. These "Y" shaped fork members or clevices 15 are connected to housings 16 capped by "U" shaped heads 17. These housings are of different lengths, eliminating possible troubles with points. Each connector plate 12 carries a dielectric lug 18 which functions to remove a short circuit.

The rear of the master structure or cabinet 2 contains one or more different connector plates 13 in which are seated male plugs 19, which establish connection of the circuits or networks to be controlled. Plugs 19 which connect load carrying circuits are secured by stem housings 20 which have back-to-back resilient arms 21 and elastically joined thereto. Springs 22 press the resilient arms together to form a clamp which short-circuits the load carrying circuits in order not to interrupt service.

When the units 1 are inserted into the corresponding housings in the master structure 2, their connector plates 12 become coupled with the corresponding connector plates 13. Their female terminals 15 become connected to the plugs 19. The dielectric lugs 18 move between the arms 21 in order to separate them, thus removing the short circuit. The units 1 are thereby connected into the circuits to be controlled and put into service. Extraction of the units 1 results in their being electrically uncoupled and the short-circuits being restored. The lugs 18 are dimensioned such that during insertion, connection is made before the short-circuit is removed and vice versa upon extraction, in the sequence shown in FIGS. 10 and 11.

The connector plates 12 have multiple points for location of terminals 15 and lugs 18, and the same applies to the plates 13 of the master structure 1 so that, starting with the same basic elements, each construction can be adapted to requirements, the elements 15, 18 and 19 being located in the precise lay-out required. In the same way it is feasible later to rearrange the lay-out so that the panel is reconverted to fresh functional requirements.

In order to alleviate the danger of insertion of the units 1 into housings in the master structure 2 for which they are not intended, so making a wrong connection which may result in serious damage, the units 1 carry on their rear connector plates 12 and the structure 2 carries on its connector plates 13 matching pairs of hexagonal pins 23, 24 which are partially halved, see FIGS. 8, 9, 10, 11 and 12, which allow the units 1 to be put into service only if they are correctly positioned. There is a positional coincidence in the pegs on all the units 1 and in all the plates 13 or backs of the housings in the master structure 2. By angular positioning of the pegs 23, of each unit 1 will mate only with one of the plates 13 of the structure 2 in which the angular positions are complementary. If any attempt is made to effect an incorrect coupling, the pegs 23 will not match since there is no precise correspondence between the angular positions of the pegs in the unit and those in the housing, and the pegs will strike one another preventing incorrect coupling.

With this distribution of pairs of hexagonal pegs 23 and 24, there are up to 36 possibilities of combination which satisfy the needs for a panel of up to 36 units 1.

Incorporated in the units 1 are coupling means which are intended to facilitate the operator's work of applying the considerable force needed to withdraw or insert the units 1 in that specific section in which coupling or disconnection with the connector plates 13 of the master structure 2 occur. These means are formed by captivated screws 8 which are coupled for free rotation in the units 1, coming into play with nut housings 6 mounted on the facia of the receiving structure or cabinet 2. Thus, the phase or section relating to withdrawal or insertion of the units 1 in which they are coupled or disconnected electrically, is produced by screwing or unscrewing the screws 8 in the nut housings 6 so that upon extraction, when the screws have been loosened, disconnection from the connector plate 13 of the cabinet will already have been effected, the insertion phase involving the reverse procedure.

Figure 2:
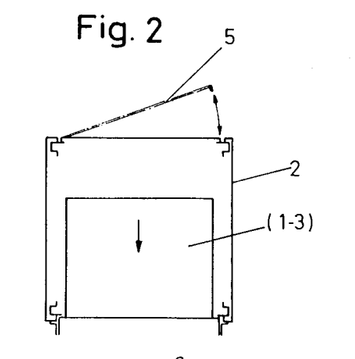
FIG. 2 is a diagrammatic plan view of the panel showing the modular construction.
Figure 3:
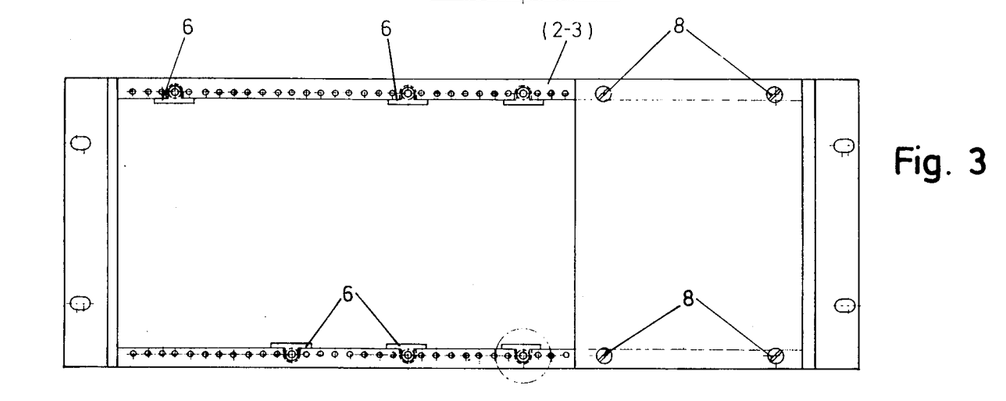
FIG. 3 is a front view of one of the trays of the master structure where modules are placed.
Figures 4, 5:
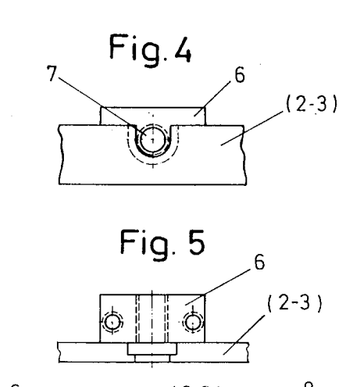
FIGS. 4 and 5 are two views of a detail taken from FIG. 3 corresponding to one of the nuts for handling the units.
Figure 6:
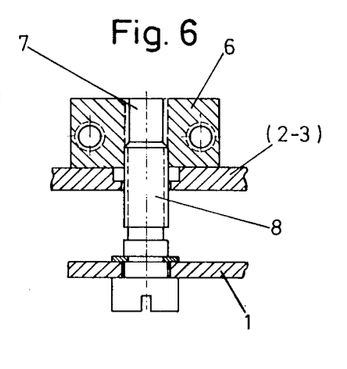
FIG. 6 is a detail, in section, showing the operation of inserting or withdrawing a unit using the bolts and nuts.
Figure 7:
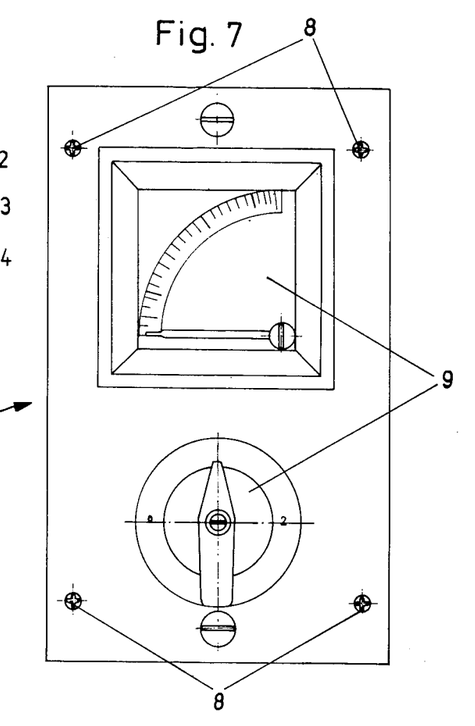
FIG. 7 is a front view of a meter unit.

The possibility is envisaged of making up the units 1 in the form of a tray 3 with handles 4, FIG. 1, the tray being inserted and occupying a transverse strip of the cabinet 2. In other cases, the trays 3 are fixed to the cabinet 2 and receive various units therein. The master structure 2 or receiving cabinet contains a rear door 5, FIG. 2, for providing access to the connector plates 13.

Figure 9:
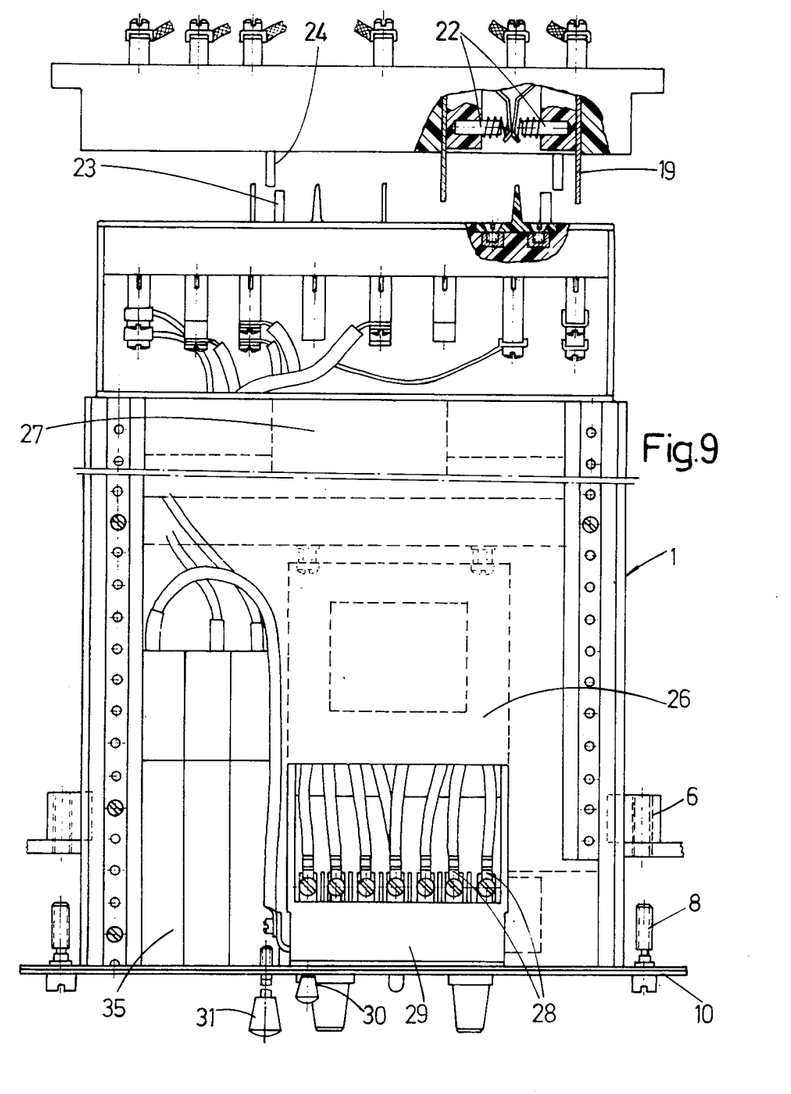
FIG. 9 is a plan view of the protection unit.
Figure 10:
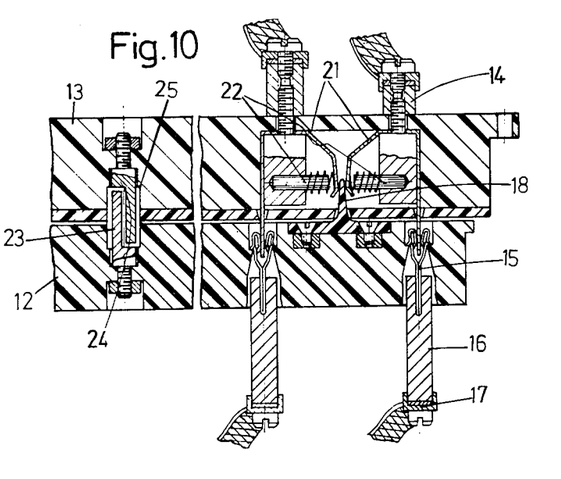
FIGS. 10 and 11 show the effect of coupling the connector plates to one another in sequence, so performing the action of putting the units into service by inserting them into the master structure or cabinet until such time as they are coupled with the connector plate thereof.
Figure 11:
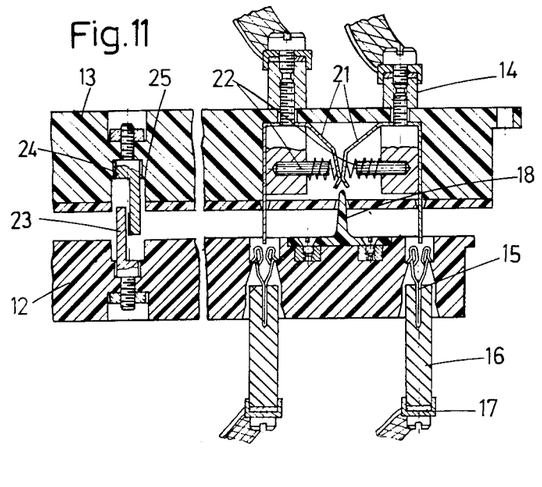
Figure 12:
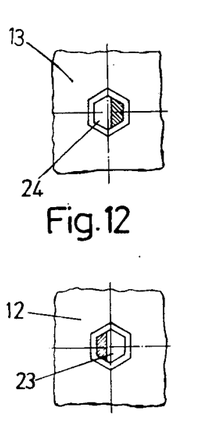
FIG. 12 shows a cross section of keying pegs adapted to prevent incorrect coupling.
Figures 13, 22:
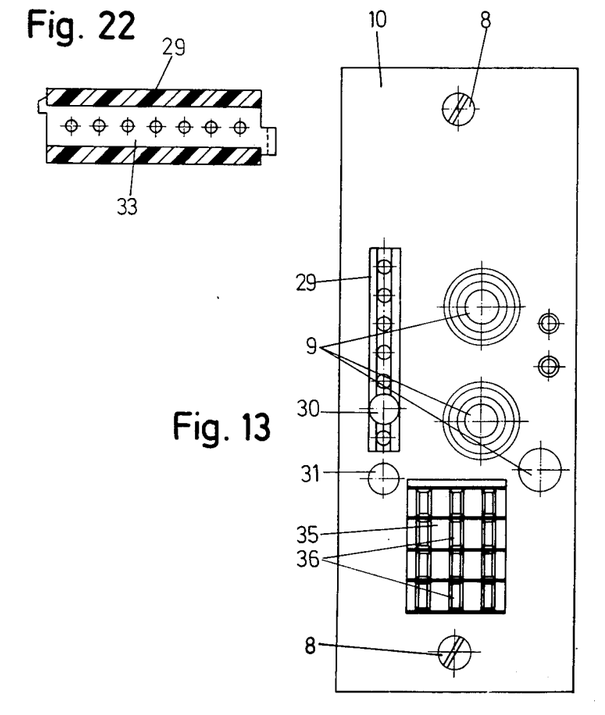
FIG. 13 is a front view of the protective unit shown in FIG. 9.
FIGS. 20, 21 and 22 show the solution for changing the size of the transformer in this protective unit.
Figures 14, 15:
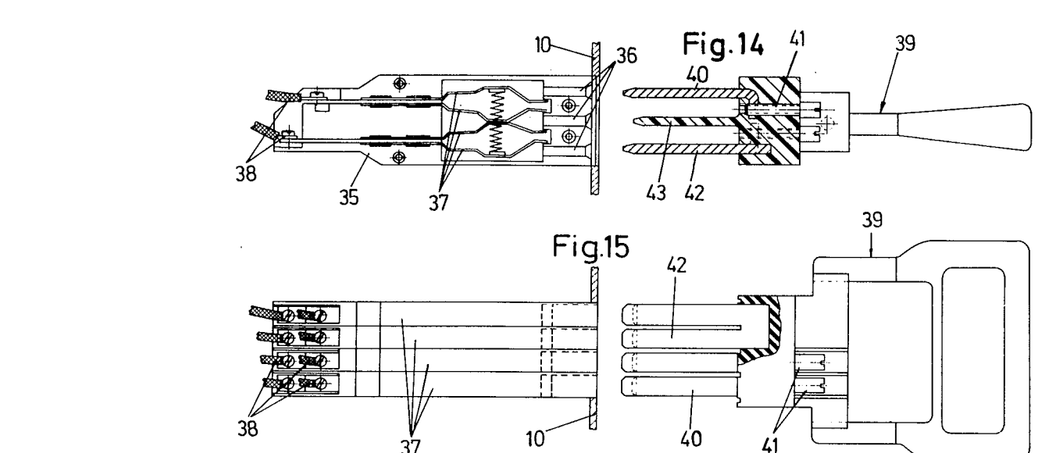
FIGS. 14, 15, 16 and 17 show the connector and external bridging plug for verifying a relay or controlling the protective unit.
Figure 16:
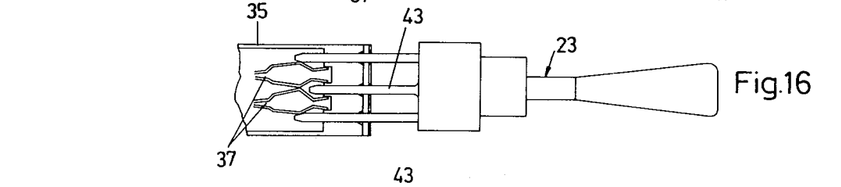
Figure 17:
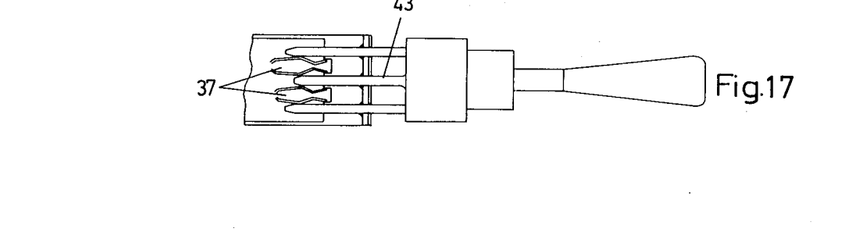

In order to render it feasible to change taps on the transformer 26 in the protective units 1, FIG. 9, in order to regulate the voltage or current at which protection is triggered, these protective units incorporate a moulded body 29 which allows this to happen. This body, moulded from dielectric material 29 is mounted flush on the facia 10 of the unit and carries, incorporated during the actual moulding operation, a series of sleeves 32 turned to a point so that they cannot come out, so that from the back the sleeves 32 emerge separately between partitions. Wire connections 28 from taps on the transformer 26 are connected to the back of the sleeves 32. In the front the sleeves 32 open out behind a frontal groove in the body 29 orientated towards the front 10 of the unit. Incorporated into this groove is a longitudinal metal shorting plate 33 which constitutes a common output connector 34, being secured by engagement of an end lug. The metal shorting plate 33 contains a series of holes aligned with the mouths of the sleeves 32. The sleeves 32 are internally threaded. Selection of a transformer tap is made by a plug 30 which can be threadingly engaged into a selected sleeve 32, passing through the plate 33 and thus to establish its electrical connection therewith. Provision is made for the inclusion of a supplementary plug 31 which can be used to change transformer taps before the plug 30 is removed in order that the circuit is not left open at any time. Therefore, it is not necessary to withdraw from service any unit 1 in order to change its transformer tap. Such an operation can be performed from the front panel while everything remains in service.

This protective unit makes the connection of the elements which control the protective device or relay 27. The connection between the meter relay and the transformer 26, as well as other connections to this relay, for example those of the time delay contact and the instant-action contact thereof, can be checked via a test connector 35 formed in modules and coupled to the facia 10.

This test connector, FIGS. 9, 14, 15, 16, and 17 is formed by bodies of dielectric material 35 in which are housed pairs of blades 37 which make the connection 38 at one end, while at the other they join resiliently, establishing the connection so that groups of three female terminals 36 are defined on the facia 10 of the unit 1, the lateral terminals of which engage with the blades 37 independently while the central terminals engage with the clamps where the said blades establish the connection.

Incorporated into the unit is a test plug 39 carrying lugs in groups of three and corresponding to the terminals 36 of the test connector 35. The central lugs 43 are of the same dielectric material as the test plug 39, while the lateral ones 40 are conductors embedded therein, and are coupled to sleeves 4 to provide external tappings, but two 42 form an "L" and are therefore bridged.

Figures 18, 19:
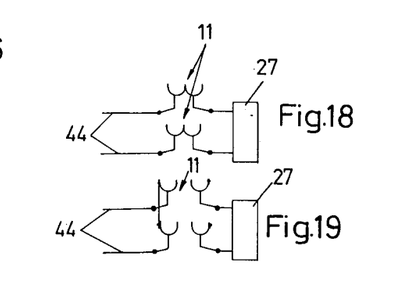
FIGS. 18 and 19 are schematic diagrams showing the effect of the connector and bridging plug.
Figure 20:
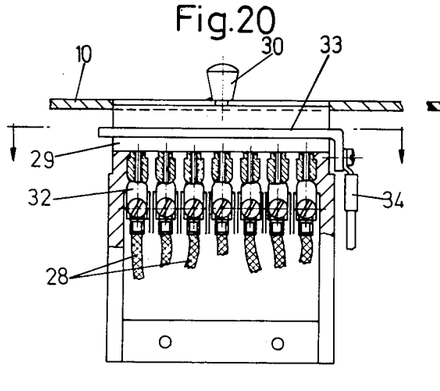
Figure 21:
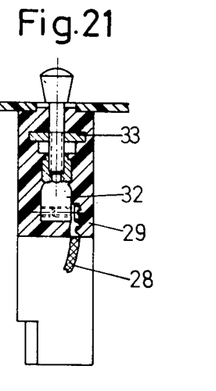

In this way the test plug 39 can be coupled to the facia of the unit 1, while the unit is in service. When the terminals of each test plug 39 are pushed home into the housings, their central insulating lugs 43 bringing about separation of the blades 37, while their lateral metallic lugs 40, 42 establish contact with the blades 37 independently so that in the only operative position of engagement, the two bridged lugs 42 corresponding to the blades 37 connected to the supply circuit 44, bridging it or closing it, while the other lugs 40 correspond to the blades 37 connected to the means of controlling the protective device or relay 27, its sleeves 41 providing external tappings for this, as explained in drawings 18 and 19.

For each line and its corresponding elements there will be a test connector, the test plug serving for all test connectors. It has been envisaged to define one single position of engagement thereof by means of an enlargement of one of the lugs of the contact and that of only one of the housings in the scale, and likewise it is envisaged to dimension the lugs 43 so that they make the clamps open after the connections with the other lugs 40, 42 have been made, so avoiding the supply circuit being left open, which could cause damage in the transformer.

The nature of the present invention, and its industrial implementation having been adequately described, it is necessary only to add that in its entirety and in its constituent parts it is possible to introduce changes of form, material and disposition insofar as such alterations so not give rise to any substantial variation thereof.

I claim:

1. A modular switching and control system comprising;
   a. a master structure;
   b. a plurality of independent switching and control units;
   c. said independent switching and control units being of at least first and second different types;
   d. said master structure containing mechanical means cooperative with means on said switching and control units for mounting said switching and control units in and removing them from said master structure;
   e. said mechanical means being of at least first and second types and having means for preventing mounting of at least said second type of switching and control unit in said first type of mechanical means;
   f. a plurality of first electrical connector plates in said master structure;
   g. a second electrical connector plate on the rear of each switching and control unit, said second electrical connector plate being adapted to electrical and mechanical mating with at least one of said first electrical connector plates in said master structure;
   h. means in each said first electrical connectors which is associated with an external load carrying circuit for maintaining power to the external load carrying circuit when its associated second electrical connector is withdrawn;
   i. means in each said second electrical connector which is associated with an external load carrying circuit for interrupting said means for maintaining when said second first connectors are mated;
   j. a test connector on at least one switching and control unit said test connector being accessible from external to said unit;
   k. a test plug having terminals adapted to mating with said test cnnector; and
   l. means on said test connector and test plug for making electrical connections with circuits within said switching and control unit.

2. The system recited in claim 1 further comprising:
   a. said first connectors each contains first and second male plugs;
   b. said first and second male plugs having first and second arms respectively;
   c. said first and second arms being resiliently urged toward electrical contact with each other, whereby a shorting clamp across said first and second male plugs is formed;
   d. said second connectors each containing first and second female terminals adapted to mating with said first and second male plugs respectively when said unit is mounted in said master structure;
   e. a male dielectric plug on said second electrical connector adapted to insertion between said first and second arms when said unit is inserted in said master structure, whereby said arms are separated; and
   f. said first and second male plugs making electrical contact with said first and second female terminals before said arms are separated.

3. The system recited in claim 1 further comprising:
   a. at least one test connector in the face of at least one of said relay or control units;
   b. said test connector having a plurality of female terminals;
   c. a test plug having a plurality of male terminals thereon adapted to mating with the female terminals of said test connector;
   d. at least one pair of blades within said test connector forming a connected clamp;
   e. means in said test connector and test plug for bridging the supply circuit of said unit; and
   f. means in said test connector and said test plug for test connection to the electrical elements within said unit without requiring the withdrawal of said unit from service.

4. The system recited in claim 3 further comprising:
   a. said test connector having at least one group of three holes;
   b. first and second blades coupled back to back in the center hole forming a connector clamp therein;
   c. third and fourth independent blades respectively in the outer two holes;
   d. the male terminals on said test plug forming at least one group of three projections adapted to insertion into said at least one group of three holes;
   e. the center male terminal on said test plug being of dielectric material;
   f. said center male terminal being adapted to separating said connector clamp when inserted into the center hole in said test connector;
   g. at least two of said outer male terminals being permanently connected together; and
   h. at least one electrical connection on said test connector being accessible to external test instruments.

5. The system recited in claim 1 wherein each unit which contains a transformer requiring output adjustment further comprises:
   a. taps on said transformer terminating in a plurality of sleeves;
   b. said sleeves being accessible external to said unit;

c. a connector plate containing apertures aligned with said plurality of sleeves; and d. at least one plug adapted to fitting through any one of said holes and into its aligned sleeve whereby electrical connection between them is achieved.

6. The system recited in claim 1 said mechanical means comprises:

a. at least one first peg attached to said master structure;

b. at least one second peg attached to the rear of at least said second type of switching and control unit;

c. said first and second pegs having axes substantially coincident when said unit is installed in said master structure;

d. said first and second pegs being shaped to pass adjacent to each other when in correct rotational alignment and to interfere with each other when in any other angular alignment; and e. interference between sad first pegs preventing mating of said first and second electrical connectors.

* * * * *

UNITED STATES PATENT AND TRADEMARK OFFICE
CERTIFICATE OF CORRECTION

PATENT NO. : 4,053,724
DATED : October 11, 1977
INVENTOR(S) : Jesus Gomez Llona

It is certified that error appears in the above-identified patent and that said Letters Patent are hereby corrected as shown below:

Column 4, line 8, after "units" --1-- was omitted.

Column 5, line 65, after "second" --and-- was omitted.

Column 6, line 2, "cnnecter" should read --connecter--.

Signed and Sealed this

Twenty-fifth Day of April 1978

[SEAL]

Attest:

RUTH C. MASON
Attesting Officer

LUTRELLE F. PARKER
Acting Commissioner of Patents and Trademarks